United States Patent
Zhao et al.

(10) Patent No.: US 9,656,234 B2
(45) Date of Patent: May 23, 2017

(54) INDUSTRIAL MICROWAVE ULTRASONIC REACTOR CHEMICAL LEACHING METHOD

(71) Applicant: EXPLOITER MOLYBDENUM CO., LTD., Luoyang, Henan (CN)

(72) Inventors: Weigen Zhao, Luoyang (CN); Longfei Zhao, Luoyang (CN); Nian Li, Luoyang (CN); Jiafu Fan, Luoyang (CN)

(73) Assignee: EXPLOITER MOLYBDENUM CO., LTD., Luoyang (CN)

( * ) Notice: Subject to any disclaimer, the term of this patent is extended or adjusted under 35 U.S.C. 154(b) by 216 days.

(21) Appl. No.: 14/401,403

(22) PCT Filed: Apr. 11, 2013

(86) PCT No.: PCT/CN2013/074075
§ 371 (c)(1),
(2) Date: Nov. 14, 2014

(87) PCT Pub. No.: WO2013/170678
PCT Pub. Date: Nov. 21, 2013

(65) Prior Publication Data
US 2015/0144480 A1 May 28, 2015

(30) Foreign Application Priority Data
May 15, 2012 (CN) .......................... 2012 1 0149705

(51) Int. Cl.
*B01J 19/10* (2006.01)
*C22B 4/00* (2006.01)
(Continued)

(52) U.S. Cl.
CPC ........... *B01J 19/10* (2013.01); *B01J 19/0066* (2013.01); *B01J 19/02* (2013.01); *B01J 19/126* (2013.01);
(Continued)

(58) Field of Classification Search
CPC ........ B01J 19/10; B01J 19/0066; B01J 19/02; B01J 9/126; B01J 19/18; B01J 19/1881;
(Continued)

(56) References Cited

U.S. PATENT DOCUMENTS 3,991,156 A * 11/1976 Ronzio ................. C01G 39/06
423/53
2009/0178914 A1 7/2009 Longo et al.
2010/0263482 A1* 10/2010 Liubakka ................ C22B 1/00
75/10.13

FOREIGN PATENT DOCUMENTS

CN 201070547 Y 6/2008
CN 201186171 Y 1/2009
(Continued)

OTHER PUBLICATIONS

Jul. 18, 2013 International Search Report issued in International Patent Application No. PCT/CN2013/074075.
(Continued)

*Primary Examiner* — Xiuyu Tai
(74) *Attorney, Agent, or Firm* — Oliff PLC

(57) ABSTRACT

An industrial microwave ultrasonic reactor has an inner wall liner. A microwave generation device is formed by microwave units distributed on an outer sidewall, or by a microwave pipe disposed outside the reactor and microwave units distributed on the microwave pipe. One end of the microwave pipe communicates with the bottom of the reactor via a connection pipe I, and the other end communicates with the top via a return pipe. A shield is disposed outside the
(Continued)

microwave generation device to separate the microwave units from the outside, and a heat removal device is disposed outside the shield. An ultrasonic wave generation device is formed by 10 to 30 sets of ultrasonic pulse units disposed at intervals along the outer sidewall. Each set has 10 to 50 members distributed along the circumferential direction of the reactor. A stirring shaft is fixed below a stirring motor and extends into the reactor.

10 Claims, 7 Drawing Sheets

(51) Int. Cl.
*C22B 34/34* (2006.01)
*B01J 19/00* (2006.01)
*B01J 19/12* (2006.01)
*B01J 19/18* (2006.01)
*B01J 19/24* (2006.01)
*B01J 19/02* (2006.01)

(52) U.S. Cl.
CPC ........... *B01J 19/18* (2013.01); *B01J 19/1881* (2013.01); *B01J 19/243* (2013.01); *B01J 19/2415* (2013.01); *C22B 4/00* (2013.01); *C22B 34/34* (2013.01); *B01J 2219/0209* (2013.01); *B01J 2219/0245* (2013.01); *B01J 2219/1215* (2013.01); *B01J 2219/1242* (2013.01); *B01J 2219/1272* (2013.01); *B01J 2219/1284* (2013.01); *B01J 2219/1296* (2013.01)

(58) Field of Classification Search
CPC ................... B01J 19/2415; B01J 19/243; B01J 2219/0209; B01J 2219/0245; B01J 2219/1215; B01J 2219/1242; B01J 2219/1272; B01J 2219/1284; B01J 2219/01; C22B 4/00; C22B 34/34
See application file for complete search history.

(56) References Cited

FOREIGN PATENT DOCUMENTS

| | | |
|---|---|---|
| CN | 100475303 C | 4/2009 |
| CN | 201625531 U | 11/2010 |
| KR | 10-0965061 B1 | 6/2010 |

OTHER PUBLICATIONS

Jul. 18, 2013 International Written Opinion issued in International Patent Application No. PCT/CN2013/074075.

Jan. 3, 2014 International Preliminary Report on Patentability issued in International Patent Application No. PCT/CN2013/074075.

* cited by examiner

INDUSTRIAL MICROWAVE ULTRASONIC REACTOR CHEMICAL LEACHING METHOD

BACKGROUND

Field of the Invention

The present invention relates generally, to the field of physical/chemical reaction engineering equipment and relates more specifically to an industrial microwave ultrasonic reactor.

Related Art

Microwave is a type of electromagnetic wave having a wavelength in the range of those of infrared ray and ultrasonic wave, and has a wavelength in the range of 1 m to 1 mm and a frequency being 300 MHz to 300 KMHz. Microwave heating is to induce molecular polarization and dipole rotation by means of interaction between microwave and molecules, so as to cause rapid movement of molecules. Therefore, microwave heating has strong penetration effect and can reach the internal of materials, so that the temperature inside the materials is rapidly increased, and ingredients are freely released, thereby achieving the purpose of removing or extracting the ingredients, and meanwhile, the reaction rate is significantly increased, and the chemical reaction activation energy is reduced. When microwave meets different media during transmission, due to different main properties of the media such as the dielectric constant, the dielectric loss factor, the specific heat, the shape, and the moisture content, the reflection, absorption, or penetration effect is generated; therefore, the absorbed electric field energy is different, and selective heating may be performed. An aqueous material is generally an absorbent medium, and can be heated by microwave.

Ultrasonic wave is a type of mechanical wave having a vibration frequency greater than 20 KHz, utilizes mechanical effects to improve the dispersibility, and can allow heterogeneous reactions to be carried out smoothly. Propagation of ultrasonic wave needs an energy carrier, that is, a medium, and during transmission, an alternating cycle of positive and negative pressure exists. In the positive phase, the medium molecules are squeezed to increase the original density of the medium, and in the negative phase, the medium molecules are few and scattered, the density of the discrete medium is decreased, and acoustic cavitation occurs between the solvent and the sample, resulting in formation, growth, blasting and compression of bubbles in the solution, so that the solid sample is dispersed, the contact area between the sample and solvent is increased, and the mass transfer rate of the object from the solid phase into the liquid phase is improved. Secondary effects of ultrasound such as mechanical shocking, emulsification, diffusion, and crushing all are beneficial to all-round full mixing of the reactants, so that a stirring effect more effective than that of common unidirectional stirring is achieved.

Reactors using microwave and ultrasound in coordination for impurity removal, purification, catalyzing reactions, and strengthening chemical reactions are widely used in the technical field of chemical engineering, for example, Chinese Utility Model Patent No. 200920282481.4: Multifunctional Ultrasonic Microwave Chemical Reactor; US Patent No. US2009/0178914A; Chinese Utility Model Patent No. 200820079506.6: Microwave Ultrasonic Wave Combined Catalysis and Synthesis Extractor; Chinese Patent No. 200510122058.4: Resonator with Tuning and Microwave/Ultrasonic Wave Combined for Reinforcing Digestion/Extraction of Sample; and Chinese Patent No. 200610138359.0: Pipeline Microwave Continuous Extraction Device. Although the documents have proved that coordination of microwave and ultrasonic wave can optimize the physical/chemical reactions, microwave can penetrate polytetrafluoroethylene materials and can be reflected in metal, and ultrasonic wave can directly contact with the reactant and can also be disposed on the sidewall of a metal container, in these documents, because the amount of the reactant is small (the largest capacity of the reactor is 2000 mL), magnetic stirring can be adopted, the microwave can directly contact with the reactant, the operator can add the sample in batches and take samples for detection, and the reactor can be conveniently taken out and placed in, simultaneous using of microwave and ultrasonic wave can be easily implemented. However, the reactor is a small laboratory apparatus, and the sample treatment capacity of the reaction system is low; therefore, once the reactor is used in an industrial process, addition of a large amount of raw materials, freely moving and lifting the apparatus, uniformly mixing of heterogeneous reaction materials, and the range of action and the uniformity of microwave and ultrasonic wave cannot be solved by multiple amplification of the capacity of the reaction vessel, that is, these techniques are not suitable for large-scale industrial production, and cannot achieve continuous industrial production.

SUMMARY

The technical problem to be solved by the present invention is to provide an industrial microwave ultrasonic reactor, so as to overcome problems of an existing microwave ultrasonic reactor that a treatment capacity is low, a range of action of microwave and ultrasonic wave is limited, and uniformity is poor, thereby shortening time for chemical leaching, improving the purity of an extracted product, and improving operation efficiency.

In order to achieve the foregoing objective, the technical solutions used in the present invention are as follows. An industrial microwave ultrasonic reactor is provided, and includes a reactor, a microwave generation device, an ultrasonic wave generation device, a stirring device, and a heat removal device. A feed port and an exhaust port are disposed at the top of the reactor, a discharge port is disposed at the bottom of the reactor, and an anti-corrosion wave-transmitting material is provided on an inner wall of the reactor. The microwave generation device is formed by microwave units distributed at intervals on an outer sidewall of the reactor, or is formed by a microwave pipe disposed outside the reactor and microwave units distributed at intervals on the microwave pipe. Each microwave unit includes a magnetron, a diode, a transformer and a waveguide that are electrically connected. One end of the microwave pipe communicates with the bottom of the reactor via a connection pipe I, and the other end communicates with the top of the reactor via a return pipe. A shield is disposed outside the microwave generation device to separate the microwave units from the outside. The heat removal device disposed outside the shield includes a heat removal fan and an exhaust duct connected to the heat removal fan, and the exhaust duct communicates with a heat removal port on the shield. The ultrasonic wave generation device is formed by ultrasonic pulse units disposed at intervals along the outer sidewall of the reactor, 10 to 30 sets of ultrasonic pulse units are disposed from top to bottom, each set has 10 to 50 members distributed along the circumferential direction of the reactor, and each ultrasonic pulse unit includes an ultrasonic generator and a transducer that are electrically connected. The stirring device includes a stirring shaft fixed below a stirring motor and extending into the reactor, a mechanical seal is disposed at the junction of the stirring shaft and the reactor, and blades are fixed on the stirring shaft.

Preferably, a liner is a release anti-corrosion coating adhered to the inner wall of the reactor, for example, a polytetrafluoroethylene (PTFE) coating, and the thickness of the coating is 0.05 to 3 mm.

Preferably, a liner is a release anti-corrosion barrel disposed in the inner cavity of the reactor, having a shape matching the shape of the inner wall of the reactor, and having a reduced diameter, for example, a polypropylene (PP) barrel, and the thickness of the release anti-corrosion barrel is 3 to 30 mm, glass wool is disposed between the release anti-corrosion barrel and the inner wall of the reactor, and the release anti-corrosion barrel, the glass wool, and the reactor are adhered in sequence.

Preferably, magnetron power of the microwave unit is 600 to 1500 W; and power of the ultrasonic pulse unit is 0 to 5000 W.

Preferably, 2 to 6 sets of microwave units are disposed on the outer sidewall of the reactor, the sets of microwave units are distributed at positions of different heights on the outer wall of the reactor at an equal interval, each set has 2 to 18 microwave units disposed surrounding the outer wall of the reactor along a horizontal direction. The microwave units and the ultrasonic pulse units are arranged in a staggered manner. An opening corresponding to the magnetron of the microwave units is disposed on the wall of the reactor, the magnetron and the reactor are connected by using a bolt at the opening and sealed by using a polyethylene pad; each set of microwave units and each set of ultrasonic pulse units separately have an independent power switch.

The microwave pipe is made of a metal outer wall lined with a wave-transmitting material, and the microwave pipe is designed to be a straight pipe, a serpentine pipe, or a spiral pipe. The magnetron of the microwave units is disposed on the outer wall of the microwave pipe. The return pipe includes a connection pipe II, a transfer pump V, and a return pipe II that are connected in sequence, the connection pipe II communicates with the microwave pipe, and the return pipe II communicates with the top of the reactor.

A guard disc having a diameter less than a diameter of the reactor is disposed in the reactor, the guard disc is coaxially fixed on the stirring shaft, and is located above a liquid level of slurry in the reactor. A return pipe I having a transfer pump IV is disposed outside the reactor, a lower end of the return pipe I communicates with the bottom of the reactor, and an upper end extends into the reactor through a return port at the top of the reactor and reaches the above of the guard disc.

A transfer pump III and a circulation pipe connected to the transfer pump III are disposed outside the reactor, a lower end of the circulation pipe communicates with the bottom of the reactor, and an upper end communicates with a circulation port at the top of the reactor.

The stirring device has 2 to 8 sets of blades disposed from top to bottom, and the blades are designed to have one of or any combination of a propeller shape, a turbine shape, a flat paddle shape, and an anchor shape.

The reactor has a maintenance flange, and a metal protection screening is disposed along the periphery of the flange outside the maintenance flange.

The industrial microwave ultrasonic reactor of the present invention is applicable to various chemical processes using microwave and/or ultrasonic wave, for example, chemical reactions using microwave and/or ultrasonic wave, or chemical extraction processes using microwave and/or ultrasonic wave. In a specific embodiment of the present invention, the present invention provides use of the industrial microwave ultrasonic reactor in preparing molybdenum disulfide by using molybdenite as raw materials and by using chemical leaching for impurity removal.

In the present invention, the industrial microwave ultrasonic reactor of the present invention is further described in combination with preparation of molybdenum disulfide from molybdenite.

The present invention has the following beneficial effects:

1. Operation Time is Shortened, and Operation Efficiency is Improved.

By using the microwave ultrasonic reactor of the present invention, due to the unique design of the microwave generation device and the ultrasonic wave generation device, the range of action of microwave and ultrasonic wave is larger, and the uniformity is higher. In a specific implementation manner, in preparation of molybdenum disulfide by leaching out impurities from molybdenite by using the microwave ultrasonic reactor of the present invention, the operation time is shortened to be 20 to 60 min from 360 to 480 min for a conventional reactor, so that leaching time is shortened, labor intensity is lowered, and the operation efficiency is improved.

2. Leaching Efficiency and Product Quality are Improved.

In a specific implementation manner, in preparation of molybdenum disulfide by leaching impurities from molybdenite by using the microwave ultrasonic reactor of the present invention, leaching temperature is 60° C. to 90° C., the purity of the prepared molybdenum disulfide is up to 99.9%, the leaching efficiency is significantly improved, and the purity of the purified product is improved.

3. Industrial Production is Actually Implemented.

The microwave ultrasonic reactor of the present invention overcomes the disadvantage that the prior art most is confined in treatment of a small quantity of samples in the laboratory, can be adaptively designed according to the wave absorption properties of solid and liquid materials and industrial demands, a reactor capacity can be designed to be 2 m$^3$ and more, thereby actually implementing industrialization. Moreover, the microwave units and the ultrasonic pulse units have independent power switches based on the set, when a treatment capacity is reduced, corresponding sets can be suitably turned off, thereby flexibly matching changes in production and saving energy.

4. Continuous Production can be Implemented.

According to the microwave ultrasonic reactor of the present invention, because microwave is used for rapid heating and ultrasonic vibration is used to strengthen a heterogeneous reaction process, and the circulation pipe is disposed to intensify stirring and mixing, the chemical processes such as leaching and dissolution are significantly accelerated, and the feed and discharging time interval is shortened, thereby implementing continuous production.

BRIEF DESCRIPTION OF THE DRAWINGS

The disclosure will become more fully understood from the detailed description given herein below for illustration only, and thus are not limitative of the disclosure, and wherein.

Figure 1:
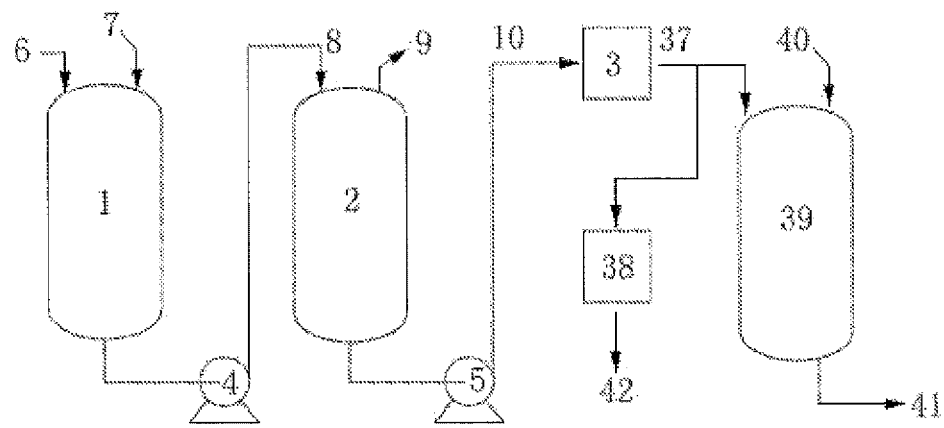
FIG. 1 is a schematic flowchart of premixing-extraction-filtering-drying of preparation of molybdenum disulfide from molybdenite by using chemical leaching for impurity removal.

In the drawings: 1. premixing tank; 2. microwave ultrasonic reactor; 3. filter device; 4. transfer pump I; 5. transfer pump II; 6. molybdenite powder; 7. leaching solution; 8. feeding of mixed slurry; 9. exhaust; 10. leaching discharge; 11. reactor; 12. microwave unit; 13. ultrasonic pulse unit; 14. feed port; 15. exhaust port; 16. discharge port; 17. stirring motor; 18. blade; 19. mechanical seal; 20. PTFE coating; 21. outer frame; 22. view window; 23. stirring shaft; 24. release anti-corrosion barrel; 25. glass wool; 26. circulation pipe; 27. transfer pump III; 28. circulation port; 29. guard disc; 30. liquid level of slurry; 31. pipeline microwave generation device; 32. connection pipe I; 33. connection pipe II; 34. return pipe I; 35. microwave pipe; 36. outer box; 37. leaching powder; 38. drying apparatus; 39. standby mixing tank; 40. leaching solution II; 41. mixed slurry feed II; 42. product; 43. flange; 44. anchor-shaped frame; 45. metal mesh; 46. exhaust duct; 47. heat removal fan; 48. exhaust port; 49. return port; 50. transfer pump IV; 51. return pipe II; 52. transfer pump V.

DETAILED DESCRIPTION

The technical solutions of the present invention are described in detail below with reference to the accompanying drawings and embodiments, but the protection scope of the present invention includes, but not limited to, the embodiments.

In the following, using preparation of molybdenum disulfide from molybdenite as an example, the present invention is further described in detail with reference to the accompanying drawings and specific embodiments. A brief flowchart of operations of premixing-extraction-filtering-drying for preparation of molybdenum disulfide from molybdenite by using chemical leaching for impurity removal is shown in FIG. 1, and the steps are:

1. adding to a premixing tank 1, a required amount of leaching solution 7 (the raw material molybdenite has been detected, and the required amount of leaching solution has been calculated), and adding molybdenite powder 6 to the premixing tank 1 with stirring to form a mixed slurry feed 8 through mixing;

2. starting stirring of a microwave ultrasonic reactor 2, starting a heat removal fan, pumping the mixed slurry feed 8 into the microwave ultrasonic reactor 2 by using a transfer pump I 4; and if needed, forming internal circulation at the same time;

3. starting microwave heating of the reactor 2, and determining no microwave leakage through detection by using a microwave leakage tester;

4. starting ultrasonic pulse units 13 of the reactor 2 to discontinuously generate ultrasonic vibration;

5. controlling microwave heating leaching temperature to be 60° C. to 90° C., and maintaining this temperature for 20 to 60 min for impurity leaching;

6. stopping microwave heating and ultrasonic wave;

7. pumping a leaching discharge 10 into a filter device 3 by using a transfer pump II 5 for solid-liquid separation, to obtain leaching powder 37;

8. feeding the leaching powder 37 into a standby mixing tank 39, and adding a required amount of leaching solution II 40 to the standby mixing tank 39 and mixing, to obtain a mixed slurry feed II 41; pumping the mixed slurry feed II 41 into the microwave ultrasonic reactor 2, repeating steps 2 to 7 at a set temperature for a set time, and so on, to obtain leaching powder through three-step leaching;

9. feeding the leaching powder obtained through the three-step leaching into a drying apparatus 38 for drying and moisture removal, to obtain a molybdenum disulfide product 42; and 10. pumping the mixed slurry feed 8 premixed in the premixing tank 1 into the reactor 2 by using a transfer pump I 4 for a next round of microwave ultrasound assisted leaching, and so on, thereby implementing continuous production.

Embodiment 1

As shown in FIG. 2, FIG. 3, FIG. 4, and FIG. 5, a microwave ultrasonic wave reactor 2 includes a reactor 11, a microwave generation device, an ultrasonic wave generation device, a stirring device, and a heat removal device. A feed port 14, an exhaust port 15, a view window 22, a pressure relief valve, and a pressure gauge (not shown in the figures) are disposed at the top of the reactor 11, and a discharge port 16 is disposed at the bottom of the reactor 11.

The reactor 11 is a cylindrical reactor, and a liner of the reactor 11 is made of an anti-corrosion wave-transmitting material, and preferably is a PTFE coating 20 having a thickness being 0.05 to 1 mm, so as to prevent apparatus corrosion due to direct contact of the reactor with the leaching solution such as hydrochloric acid, hydrofluoric acid, and a chloride salt.

The microwave generation device includes 4 sets of microwave units 12 that are horizontally arranged, and each set has 8 microwave units 12 arranged at intervals along the circumferential direction of an outer sidewall of the reactor 11. The microwave unit 12 includes a magnetron, a diode, a transformer, and a waveguide that are electrically connected, and can generate microwaves in a working state to heat materials in the reactor 2. An opening is disposed at a corresponding junction of the reactor 11 and the magnetron, and the magnetron and the reactor 11 are connected by using a bolt at the opening and sealed by using a polyethylene pad. Because the acidic atmosphere of the leaching solution easily cause apparatus corrosion in the working environment, in order to reduce the corrosion of electrical components of the microwave unit 12, the diode, the transformer, and a capacitance in the microwave units 12 except the magnetron can be installed in a protection cover outside the working environment in a concentrated manner to avoid corrosion due to contact with the acidic atmosphere in the working environment, and the magnetron communicates with other electrical components through a high voltage circuit. The ultrasonic wave generation device includes 12 sets of ultrasonic pulse units 13 that are horizontally disposed, and each set has 24 ultrasonic pulse units 13 arranged at intervals along the circumferential direction of the outer sidewall of the reactor 11. The ultrasonic pulse unit 13 is provided with an ultrasonic generator and a transducer that are electrically connected. The microwave units 12 and the ultrasonic pulse units 13 are arranged in a staggered manner, and separately have an independent power switch based on the set. Both a microwave generation system and an ultrasonic wave generation system are disposed below a liquid level 30 of slurry during full-load working. Magnetron power of the microwave unit 12 is 600 to 1500 W; and power of the ultrasonic pulse unit 13 is 0 to 5000 W.

A shield is disposed outside the microwave generation device to separate the microwave units from the outside. The shield is a cylindrical metal outer frame 21, and separates the reactor 11 and the microwave units 12 on a sidewall of the reactor 11 from the outside. A maintenance flange 43 is disposed outside the outer frame 21, and a junction of the flange 43 and the reactor 11 is sealed by using a PTFE pad. The heat removal device includes a heat removal fan 47 and an exhaust duct 46. One end of the exhaust duct 46 is connected to the heat removal fan 47, and the other end communicates with the outer frame 21 through a heat removal port 48. The heat removal device may remove heat by extracting air out from the shield, or may remove heat by blowing air into the shield. When an acidic or basic atmosphere exists in the working environment, the latter heat removal manner is preferred, so as to reduce the contact corrosion of the magnetron and other components, which is the same in the following embodiment, and will not described again.

Figure 2:
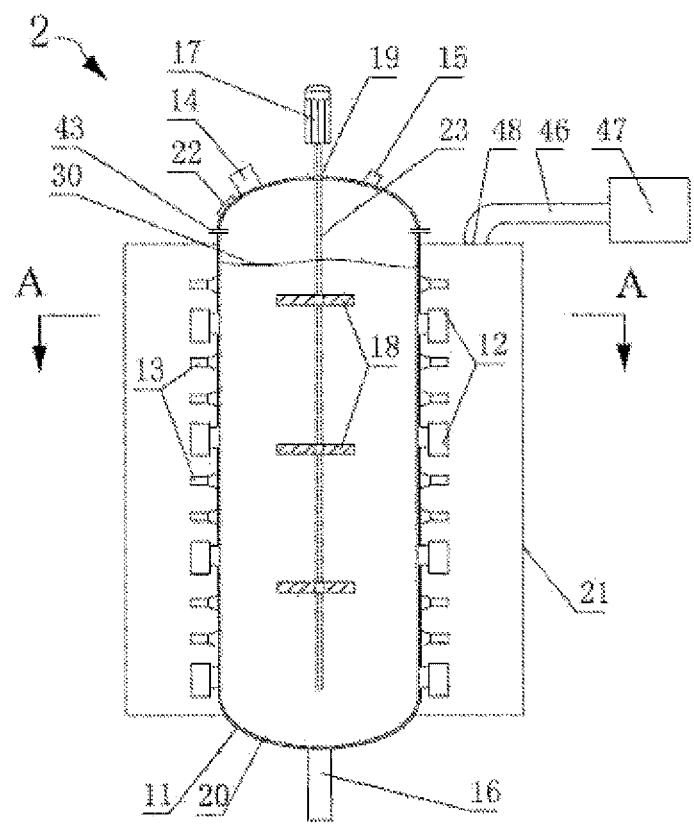
FIG. 2 is a schematic structural diagram of a microwave ultrasonic reactor according to Embodiment 1 of the present invention.
Figure 3:
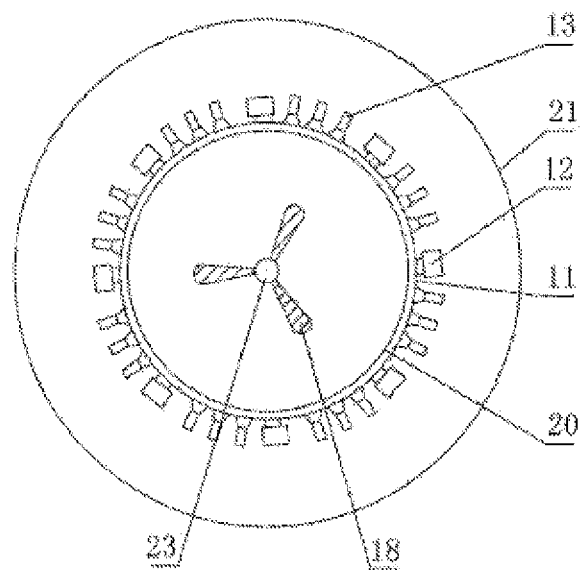
FIG. 3 is a cross-sectional view of the microwave ultrasonic reactor in FIG. 2 along a direction of A-A.
Figure 4:
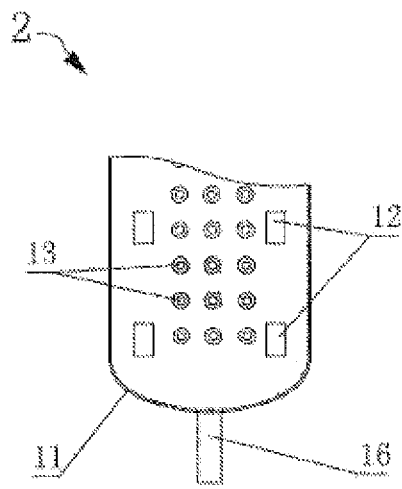
FIG. 4 is a schematic diagram of layout of microwave units and ultrasonic pulse units on an outer wall of the reactor in the microwave ultrasonic reactor in FIG. 2.
Figure 5:
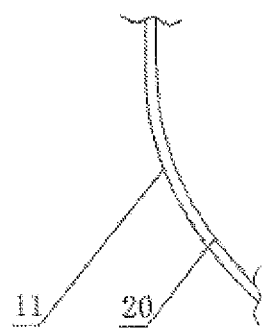
FIG. 5 is a schematic partial structural diagram of the microwave ultrasonic reactor in FIG. 2 with a liner being a PTFE coating.

The stirring device includes a stirring motor 17, a stirring shaft 23, and blades 18. The stirring shaft 23 is fixed below the stirring motor 17 and extends into the reactor 11. The stirring shaft 23 and the reactor 11 are coaxially disposed, and a mechanical seal 19 is disposed at a junction of the stirring shaft 23 and the reactor 11, as shown in FIG. 2 and FIG. 3, 3 sets of blades 18 having a propeller shape are fixed on the stirring shaft 23 from top to bottom. When working, the stirring motor 17 drives the stirring shaft 23 to rotate, and the blades 18 rotate with the stirring shaft 23 for stirring.

An anti-corrosion layer or a release anti-corrosion layer such as a PTFE layer may be disposed on the surface of the blades, so as to prolong a service life of the blades and achieve good release and anti-corrosion performance.

In specific operation and production, a mixed slurry feed 8 is pumped into the reactor 2 through the feed port 14, microwave heating and ultrasonic vibration are started, molybdenum disulfide continuously adsorbs the microwave energy, and after about 2 to 5 min, the liquid feed is heated to a temperature of 60° C. to 90° C., that is, the temperature required for leaching, and microwave heating is maintained. Under the condition of continuous stirring and discontinuous ultrasonic vibration, the dispersibility of molybdenite powder 6 in a leaching solution 7 is improved, a contact area of the impurities in the powder and the leaching solution is increased, the impurities are freely released and rapidly dissolved in the leaching solution, after leaching for about 20 to 60 min, a leaching discharge 10 is sent to the filter device 3 through the discharge port 16, and the impurities are retained in the leaching solution through solid-liquid separation.

Embodiment 2

As shown in FIG. 6, FIG. 7, FIG. 8, and FIG. 9, a microwave ultrasonic wave reactor 2 of the present invention includes a reactor 11, a microwave generation device, an ultrasonic wave generation device, a stirring device, a heat removal device, and a circulation pipe 26. A feed port 14, an exhaust port 15, and a view window 22 are disposed at the top of the reactor, and a discharge port 16 is disposed at the bottom of the reactor 11.

Figure 9:
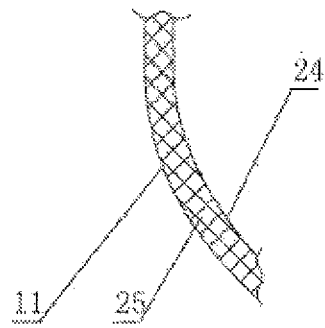
FIG. 9 is a schematic partial structural diagram of the microwave ultrasonic reactor in FIG. 6 with a liner being a release anti-corrosion barrel.
Figure 10:
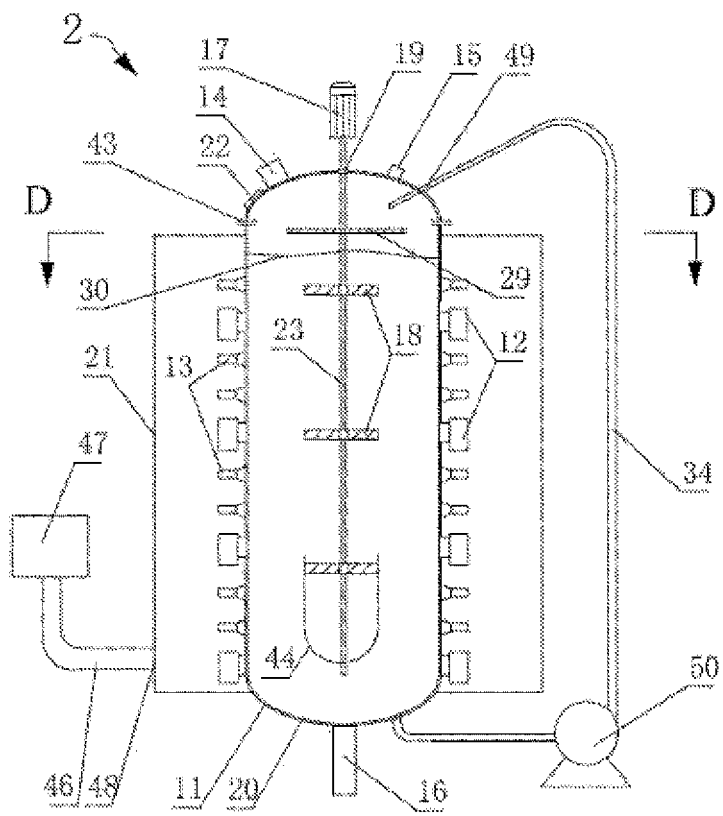
FIG. 10 is a schematic structural diagram of a microwave ultrasonic reactor according to Embodiment 3 of the present invention.

The reactor 11 is a cylindrical reactor, as shown in FIG. 9. A liner of the reactor is a release anti-corrosion barrel 24 having a shape matching a shape of an inner wall of the reactor 11, a reduced diameter, and a thickness being 3 to 30 mm, such as a PP barrel. Wave-transmitting glass wool 25 is disposed between the release anti-corrosion barrel 24 and the reactor 11, so that the release anti-corrosion barrel 24, the glass wool 25, and the reactor 11 are closely adhered to each other from inside to outside.

The microwave generation device includes 6 sets of microwave units 12 that are horizontally arranged, each set has 12 microwave units 12 arranged at intervals along the circumferential direction of an outer sidewall of the reactor 11. The microwave unit 12 includes a magnetron, a diode, a transformer, and a waveguide, and can generate microwaves in a working state to heat materials in the reactor 2. The ultrasonic wave generation device includes 12 sets of ultrasonic pulse units 13 that are horizontally arranged, and each set has 24 ultrasonic pulse units 13 arranged at intervals along the circumferential direction of the outer sidewall of the reactor 11. The ultrasonic pulse unit 13 includes an ultrasonic generator and a transducer. Both a microwave generation system and an ultrasonic wave generation system are disposed below a liquid level 30 of slurry during full-load working.

Figure 8:
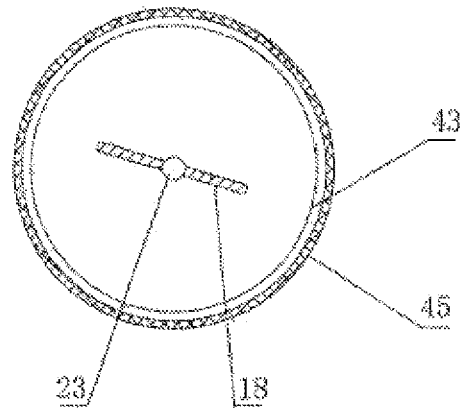
FIG. 8 is a cross-sectional view of the microwave ultrasonic reactor in FIG. 6 along a direction of C-C.

A shield is a cubic metal outer frame 21, and separates the reactor 11 and the microwave units 12 on a sidewall of the reactor 11 from the outside. A maintenance flange 43 is disposed outside the outer frame 21, and a junction of the flange 43 and the reactor 11 is sealed by using a PTFE pad, as shown in FIG. 8. A metal protection screening 45 is further disposed along the periphery of the flange outside of the flange 43, so that leakage of microwave in the reactor 11 under operation conditions can be prevented. The heat removal device includes a heat removal fan 47 and an exhaust duct 46. One end of the exhaust duct 46 is connected to the heat removal fan 47, and the other end communicates with the outer frame 21 through a heat removal port 48.

Figure 6:
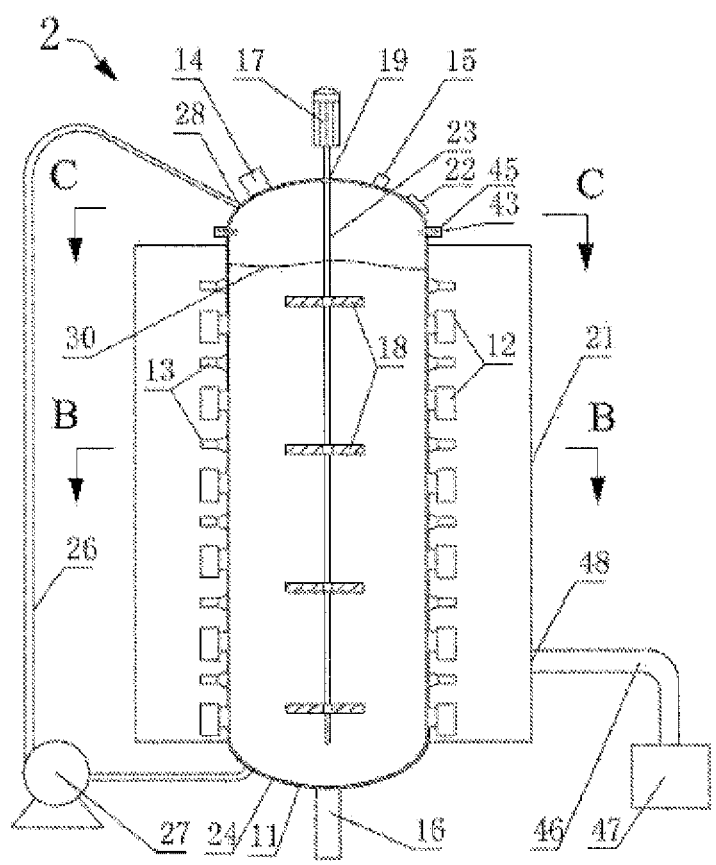
FIG. 6 is a schematic structural diagram of a microwave ultrasonic reactor according to Embodiment 2 of the present invention.
Figure 7:
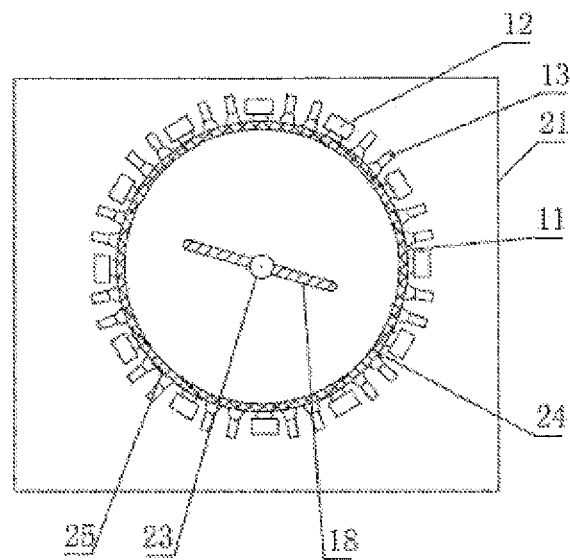
FIG. 7 is a cross-sectional view of the microwave ultrasonic reactor in FIG. 6 along a direction of B-B.

The stirring device includes a stirring motor 17, a stirring shaft 23, and blades 18. The stirring shaft 23 is fixed below the stirring motor 17 and extends into the reactor 11. The stirring shaft 23 and the reactor 11 are coaxially disposed, and a mechanical seal 19 is disposed at a junction of the stirring shaft 23 and the reactor 11, as shown in FIG. 6 and FIG. 7. 4 sets of blades 18 having a flat paddle shape are fixed on the stirring shaft 23 from top to bottom.

In addition, the circulation pipe 26 is disposed outside the reactor 2, a lower end of the circulation pipe 26 communicates with the bottom of the reactor 11, and an upper end communicates with the circulation port 28 at the top of the reactor 11. A transfer pump III 27 is disposed, so that materials form internal circulation when the reactor 2 works.

In specific operation and production, a mixed slurry feed 8 is pumped into the reactor 2 through the feed port 14, microwave heating and internal circulation are started, molybdenum disulfide continuously adsorbs the microwave energy, and after about 2 to 3 min, the liquid feed is heated to a temperature of 60° C. to 90° C., that is, the temperature required for leaching, and microwave heating is maintained. Under the condition of continuous stirring and discontinuous ultrasonic vibration, impurities in molybdenite powder 6 are released and rapidly dissolved in a leaching solution 7, and after leaching for about 20 to 60 min, a leaching discharge 10 is sent to a filter device 3 through the discharge port 16, and the impurities are retained in the leaching solution through solid-liquid separation.

Embodiment 3

As shown in FIG. 10, FIG. 11, FIG. 12, and FIG. 13, a microwave ultrasonic wave reactor 2 of the present invention includes a reactor 11, a microwave generation device, an ultrasonic wave generation device, a stirring device, a heat removal device, a guard disc 29, and a return pipe I 34. A feed port 14, an exhaust port 15, and a view window 22 are disposed at the top of the reactor, and a discharge port 16 is disposed at the bottom of the reactor 11.

Figure 11:
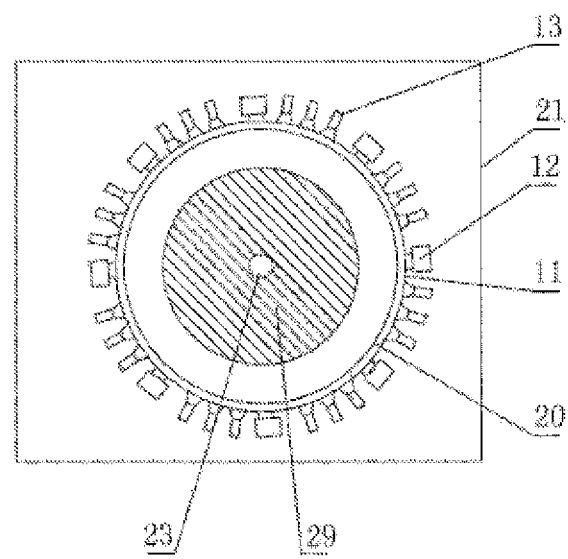
FIG. 11 is a cross-sectional view of the microwave ultrasonic reactor in FIG. 10 along a direction of D-D.

As shown in FIG. 11, the reactor 11 is a cylindrical reactor, and a liner of the reactor 11 is a PTFE coating 20 closely adhered to an inner wall of the reactor 11 and having a thickness being 0.05 to 3 mm.

The microwave generation device includes 4 sets of microwave units 12 that are horizontally arranged, each set has 8 microwave units 12 arranged at intervals along the circumferential direction of the outer sidewall of the reactor 11. The microwave unit 12 includes a magnetron, a diode, a transformer, and a waveguide, and can generate microwaves in a working state to heat materials in the reactor 2. The ultrasonic wave generation device includes 12 sets of ultrasonic pulse units 13 that are horizontally arranged, and each set has 24 ultrasonic pulse units 13 arranged at intervals along the circumferential direction of an outer sidewall of the reactor 11. The ultrasonic pulse unit 13 includes an ultrasonic generator and a transducer. Both a microwave generation system and an ultrasonic wave generation system are disposed below a liquid level 30 of slurry during full-load working.

A shield is a cubic metal outer frame 21, and separates the reactor 11 and the microwave units 12 on a sidewall of the reactor 11 from the outside. A maintenance flange 43 is disposed outside the outer frame 21, and a junction of the flange 43 and the reactor 11 is sealed by using a PTFE pad. The heat removal device includes a heat removal fan 47 and an exhaust duct 46. One end of the exhaust duct 46 is connected to the heat removal fan 47, and the other end communicates with the outer frame 21 through a heat removal port 48.

Figure 12:
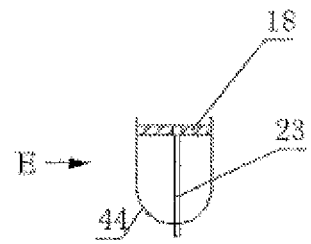
FIG. 12 is a schematic structural diagram of a stirring blade of the microwave ultrasonic reactor in FIG. 10.
Figure 13:
FIG. 13 is a schematic diagram of the stirring blade in FIG. 12 in a direction of E.

The stirring device includes a stirring motor 17, a stirring shaft 23, and blades 18. The stirring shaft 23 is fixed below the stirring motor 17 and extends into the reactor 11. The stirring shaft 23 and the reactor 11 are coaxially disposed, and a mechanical seal 19 is disposed at a junction of the stirring shaft 23 and the reactor 11. 3 sets of blades 18 are fixed on the stirring shaft 23 from top to bottom, the upper two sets of blades 18 have a flat paddle shape, and the lower set of blades 18 has an anchor shape and has an anchor-shaped frame 44. The specific structure is shown in FIG. 12 and FIG. 13. The flat paddle-shaped blades and the anchor-shaped blades are disposed in combination for stirring, which can strengthen a solid-liquid mixing effect, and improve leaching efficiency.

A guard disc 29 is a flat disc that has a diameter less than a diameter of the reactor 11, is coaxially fixed on the stirring shaft 23, and is located above the liquid level 30 of slurry of the reactor 11. During manufacturing, the guard disc 29 may be directly made of an anti-corrosion material such as PP or PTFE, and also may be made of a metal material and a surface of the metal is coated with an anti-corrosion coating such as PTFE to reduce corrosion.

A transfer pump IV 50 and a return pipe I 34 connected to the transfer pump IV 50 are disposed outside the reactor 11. A lower end of the return pipe I 34 communicates with the bottom of the reactor 11, an upper end communicates with a return port 49 at the top of the reactor 11, extends into the reactor 11 and reaches the above of the guard disc 29, so that the slurry flows back to the guard disc 29 through transportation of the transfer pump IV 50 and flows into the reactor 11 with stirring.

In specific operation and production, a mixed slurry feed 8 is pumped into the reactor 2 through the feed port 14, microwave heating and the transfer pump IV 50 are started, molybdenum disulfide continuously adsorbs the microwave energy. At the same time, the mixed slurry in the reactor flows back to the above of the guard disc 29, continuously scours the inner wall of the reactor 11 with stirring, and after about 2 to 5 min, the liquid feed is heated to a temperature of 60° C. to 90° C., that is, the temperature required for leaching, and microwave heating is maintained. Under the condition of continuous stirring and discontinuous ultrasonic vibration, impurities in molybdenite powder 6 are released and rapidly dissolved in a leaching solution 7, and after leaching for about 20 to 60 min, a leaching discharge 10 is sent to a filter device 3 through the discharge port 16, and the impurities are retained in the leaching solution through solid-liquid separation.

Embodiment 4

Figure 14:
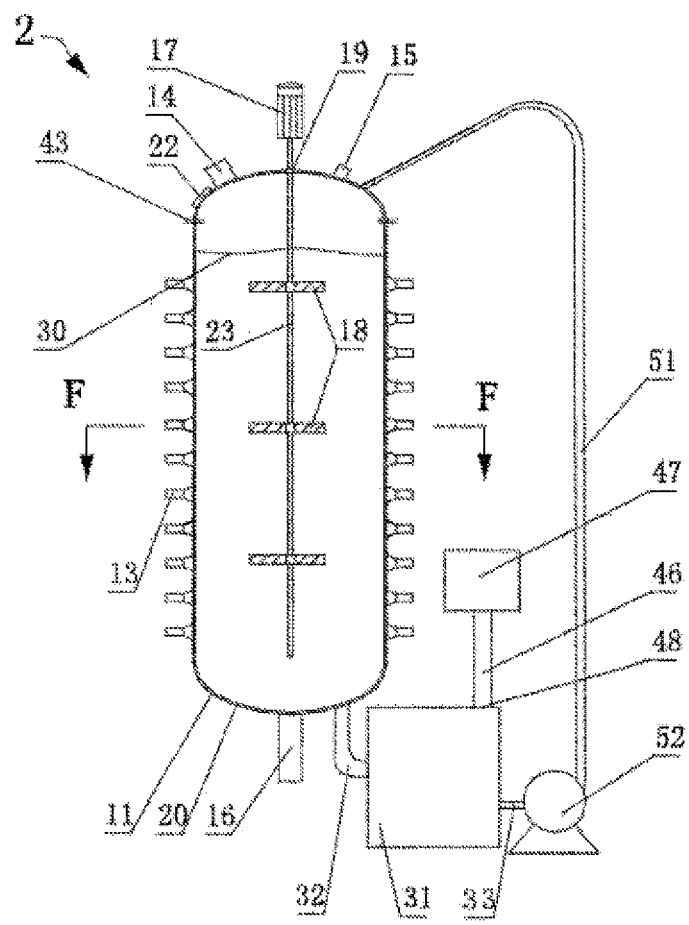
FIG. 14 is a schematic structural diagram of a microwave ultrasonic reactor according to Embodiment 4 of the present invention.
Figure 15:
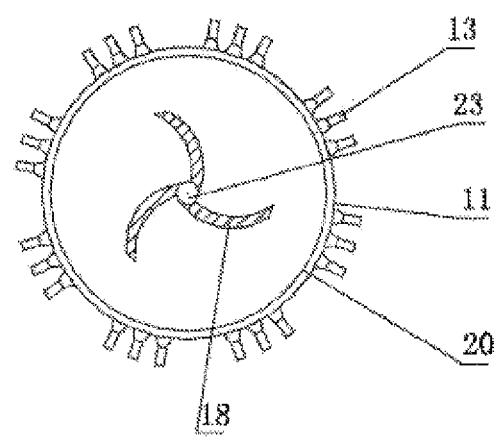
FIG. 15 is a cross-sectional view of the microwave ultrasonic reactor in FIG. 14 along a direction of F-F.
Figure 16:
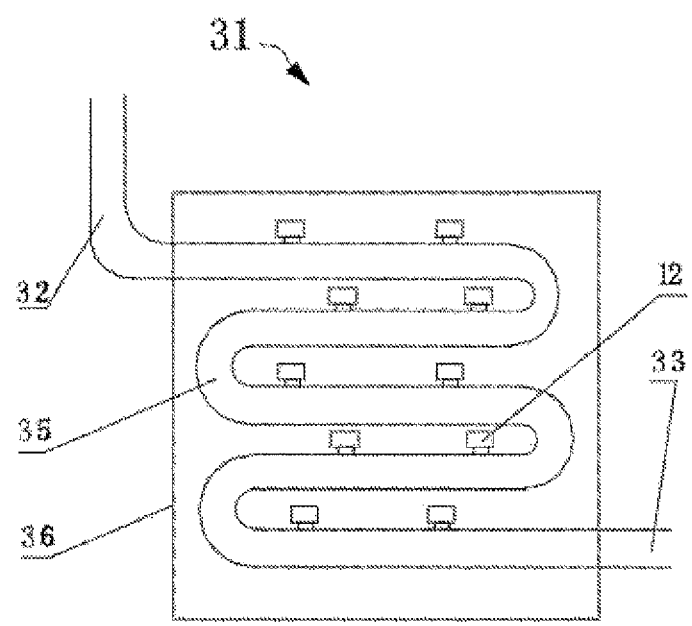
FIG. 16 is a schematic specific structural diagram of a pipeline microwave generation device of the microwave ultrasonic reactor in FIG. 14.

As shown in FIG. 14, FIG. 15, FIG. 16, a microwave ultrasonic wave reactor 2 of the present invention includes a reactor 11, a microwave generation device, an ultrasonic wave generation device, a stirring device, a heat removal device, a microwave pipe 35, and a return pipe II 51. A feed port 14, an exhaust port 15, and a view window 22 are disposed at the top of the reactor, and a discharge port 16 is disposed at the bottom of the reactor 11.

The reactor 11 is a cylindrical reactor, and a liner of the reactor is a PTFE coating 20 closely adhered to an inner wall of the reactor 11 and having a thickness being 0.05 to 3 mm. A junction of a maintenance flange 43 and the reactor 11 is sealed by using a PTFE pad.

The ultrasonic wave generation device includes 10 to 30 sets of ultrasonic pulse units 13 that are horizontally disposed, and each set has 10 to 50 ultrasonic pulse units 13 arranged at intervals along the circumferential direction of an outer sidewall of the reactor 11. The ultrasonic pulse unit 13 has an ultrasonic generator and a transducer. As in this embodiment, 11 sets of ultrasonic pulse units 13 are arranged, and each set has 24 ultrasonic pulse units 13.

The stirring device includes a stirring motor 17, a stirring shaft 23, and blades 18. The stirring shaft 23 is fixed below the stirring motor 17 and extends into the reactor 11. The stirring shaft 23 and the reactor 11 are coaxially disposed, and a mechanical seal 19 is disposed at a junction of the stirring shaft 23 and the reactor 11. 3 sets of blades 18 having a turbine shape are fixed on the stirring shaft 23 from top to bottom.

The microwave pipe 35 and the return pipe II 51 are disposed outside the reactor 11. The microwave pipe 35 is made of a metal outer wall lined with a wave-transmitting material, and according to the capacity of the reactor 2, the material properties and sites, and the microwave pipe 35 is designed to be a straight pipe, a serpentine pipe, or a spiral pipe. The microwave pipe 35 is preferably a serpentine pipe.

The microwave generation device includes 2 to 6 sets of microwave units 12 that are horizontally arranged, each set has 2 to 18 microwave units 12 that are evenly spaced. The magnetrons of the microwave units 12 are disposed on an outer wall of the microwave pipe 35 by set, and the magnetron and the microwave pipe 35 are connected by using a bolt and sealed by using a polyethylene pad.

A shield is a cubic outer box 36 made of a metal material, and separates the microwave pipe 35 and the microwave units 12 on the outer wall of the microwave pipe 35 from the outside. The heat removal device includes a heat removal fan 47 and an exhaust duct 46. One end of the exhaust duct 46 is connected to the heat removal fan 47, and the other end communicates with the outer box 36 through a heat removal port 48. As shown in FIG. 16, the outer box 36, the microwave pipe 35 disposed in the outer box 36, and the microwave units 12 disposed on the outer wall of the microwave pipe 35 together form a pipeline microwave generation device 31. One end of the pipeline microwave generation device 31 communicates with the bottom of the reactor 11 through a connection pipe I 32, and the other end communicates with the top of the reactor 11 through a connection pipe II 33, a transfer pump V 52, and the return pipe II 51 that are connected in sequence.

In specific operation and production, a mixed slurry feed 8 is pumped into the reactor 2 through the feed port 14, microwave heating and the transfer pump V 52 are started, and the slurry in the reactor 11 passes through the connection pipe I 32, the microwave generation device 31, the connection pipe II 33, the transfer pump V 52, the return pipe II 51, and the reactor 11 in sequence and circulates. When the slurry passes through the pipeline microwave generation device 31, molybdenum disulfide absorbs the microwave emitted by the microwave units 12 on the outer wall of the microwave pipe 35 and is continuously heated, and after about 2 to 10 min, the liquid feed is heated to a temperature of 60° C. to 90° C., that is, the temperature required for leaching, and is maintained at this temperature and leached for a period of time. Under the conditions of continuous stirring, returning, and discontinuous ultrasonic vibration, impurities are rapidly dissolved in a leaching solution 7, and are retained in the leaching solution through solid-liquid separation.

The disclosure is further described, for illustrative purpose, in the following specific, non-limiting Examples.

Example 1

Chemical ingredients of a batch of 200 Kg molybdenite powder are listed in Table 1. Molybdenum disulfide is prepared from the molybdenite powder by leaching by using hydrochloric acid, hydrofluoric acid, and a chloride salt for impurity removal.

TABLE 1

Chemical ingredients of molybdenite, wt %

| Ingredient | Mo | As | Sn | P | Cu | Pb | Fe | $SiO_2$ | CaO |
|---|---|---|---|---|---|---|---|---|---|
| Content | 47 | 0.06 | 0.05 | 0.04 | 0.26 | 0.31 | 0.95 | 11.0 | 2.50 |

The process shown in FIG. 1 is used as the leaching process. The leaching apparatus (the reactor 2) is the microwave ultrasonic reactor in Embodiment 1 of the present invention, which has a capacity being 2 $m^3$ and a diameter being 1.1 m. An inner wall of the reactor is coated with a PTFE coating having a thickness being 0.06 mm. Single-tube output power of a magnetron of a microwave unit is 800 W, one set has 8 microwave units that are horizontally disposed, 4 sets of magnetrons are disposed in total, and the total microwave power is 25.6 KW. Output power of an ultrasonic pulse unit is 100 W, one set has 24 ultrasonic pulse units, 12 sets of ultrasonic pulse units are disposed in total, and the ultrasonic pulse units and the microwave units are disposed in a staggered manner. Power of the stirring motor is 5.5 KW, and 3 sets of propeller-shaped stirring blades are disposed on a stirring shaft. An outer frame is a cylindrical shield, and is used as an operating platform at the same time.

Leaching parameters of specific implementation of the leaching processes are listed in Table 2. At the end of each leaching, solid-liquid separation is performed on a vacuum filter before next leaching. Powder obtained after chloride salt leaching and filtering is washed with deionized water and dried in a drying oven, to obtain a molybdenum disulfide product. After 6 batches of production, product quality is detected, and the purity of the obtained product $MoS_2$ is up to 99.91%.

TABLE 2

Leaching parameters of the leaching processes in experimental operation 1

| Item | Concentration of the leaching solution | Amount of the leaching solution | Leaching temperature | Constant temperature time |
|---|---|---|---|---|
| Hydrochloric acid leaching | 35% | 190 Kg | 65° C. | 40 min |
| Hydrofluoric acid leaching | 90% | 120 Kg | 75° C. | 45 min |
| Chloride salt leaching | $CuCl_2$ 3% + $FeCl_3$ 8% | 80 Kg | 80° C. | 30 min |

Comparative Example 1

Raw materials and a leaching agent that are the same as those in Experimental operation 1 are used, only the apparatus is replaced by a conventional induction heating reactor, which has a capacity being 2 $m^3$ and a diameter being 1.1 m. An inner wall of the reactor is coated with a PTFE coating having a thickness being 0.06 mm. Power of the stirring motor is 5.5 KW, and 3 sets of propeller-shaped stirring blades are disposed on the stirring shaft.

Leaching parameters of specific implementation of the leaching processes are listed in Table 3. Powder obtained after chloride salt leaching and filtering is washed with deionized water and dried in a drying oven, to obtain a molybdenum disulfide product. Product quality is detected, and the purity of the obtained product $MoS_2$ is up to 98.26%.

TABLE 3

Leaching parameters of the leaching processes in comparative example 1

| Item | Concentration of the leaching solution | Amount of the leaching solution | Leaching temperature | Constant temperature time |
|---|---|---|---|---|
| Hydrochloric acid leaching | 35% | 190 Kg | 65° C. | 410 min |
| Hydrofluoric acid leaching | 90% | 120 Kg | 75° C. | 450 min |
| Chloride salt leaching | $CuCl_2$ 3% + $FeCl_3$ 8% | 80 Kg | 80° C. | 380 min |

As can be seen from the results of experimental operation 1 and comparative example 1, compared with a conventional reactor, for preparation of molybdenum disulfide from molybdenite by using the microwave ultrasonic reactor of the present invention through three-step leaching, the leach rate is significantly increased, the constant temperature time is significantly shortened to be within 60 min from 360 to 480 min, and the purity of the prepared molybdenum disulfide product is increased to 99.9% and more. The quality is improved, and market competitiveness is improved.

Example 2

Chemical ingredients of a batch of 300 Kg molybdenite powder are listed in Table 1. Molybdenum disulfide is prepared from the molybdenite powder by leaching by using hydrochloric acid, hydrofluoric acid, and a chloride salt for impurity removal.

The leaching apparatus is the microwave ultrasonic reactor in Embodiment 2 of the present invention, which has a capacity being 3 m³ and a diameter being 1.5 m. A release anti-corrosion barrel having a thickness being 4 mm is placed in the reactor. Single-tube output power of the magnetron of the microwave unit is 825 W, one set has 12 microwave units that are horizontally disposed, 6 sets of magnetrons are disposed in total, and the total microwave power is 59.4 KW. Output power of the ultrasonic pulse unit is 120 W, one set has 24 ultrasonic pulse units, 12 sets of ultrasonic pulse units are disposed in total, and the ultrasonic pulse units and the microwave units are disposed in a staggered manner. Power of the stirring motor is 7.5 KW, and 4 sets of flat paddle-shaped stirring blades are disposed on the stirring shaft. The reactor has internal circulation. The outer frame is a cubic shield, and is used as an operating platform at the same time.

Leaching parameters of specific implementation of the leaching processes are listed in Table 4. At the end of each leaching, solid-liquid separation is performed on a vacuum filter before next leaching. Powder obtained after chloride salt leaching and filtering is washed with deionized water and dried in a drying oven, to obtain a molybdenum disulfide product. After 6 batches of production, product quality is detected, and the purity of the obtained product $MoS_2$ is up to 99.94%.

TABLE 4

Leaching parameters of the leaching processes in experimental operation 2

| Item | Concentration of the leaching solution | Amount of the leaching solution | Leaching temperature | Constant temperature time |
|---|---|---|---|---|
| Hydrochloric acid leaching | 30% | 63 Kg | 65° C. | 35 min |
| Hydrofluoric acid leaching | 85% | 70 Kg | 85° C. | 35 min |
| Chloride salt leaching | $CuCl_2$ 3% + $FeCl_3$ 8% | 80 Kg | 80° C. | 30 min |

Example 3

Chemical ingredients of a batch of 200 Kg molybdenite powder are listed in Table 1. Molybdenum disulfide is prepared from the molybdenite powder by leaching by using hydrochloric acid, hydrofluoric acid, and a chloride salt for impurity removal.

The leaching apparatus is the microwave ultrasonic reactor in Embodiment 3 of the present invention, which has a capacity being 2 m³ and a diameter being 1.2 m. A PTFE coating having a thickness being 1 mm is coated on an inner wall of the reactor. A metal guard disc is disposed in the reactor, which has a diameter being 0.8 m and is coated with a PTFE protection layer. A return pip is further disposed outside the reactor for transporting materials in the reactor to the guard disc. Single-tube output power of the magnetron of the microwave unit is 1000 W, one set has 8 microwave units that are horizontally disposed, 4 sets of magnetrons are disposed in total, and the total microwave power is 32 KW. Output power of the ultrasonic pulse unit is 125 W, one set has 24 ultrasonic pulse units, 12 sets of ultrasonic pulse units are disposed in total, and the ultrasonic pulse units and the microwave units are disposed in a staggered manner. Power of the stirring motor is 5 KW, and 3 sets of stirring blades are disposed on the stirring shaft. The upper two sets of the blades have a flat paddle shape, and the lower set of blades has an anchor shape. The outer frame is a cubic shield, and is used as an operating platform at the same time.

Leaching parameters of specific implementation of the leaching processes are listed in Table 5. At the end of each leaching, solid-liquid separation is performed on a vacuum filter before next leaching. Powder obtained after chloride salt leaching and filtering is washed with deionized water and dried in a drying oven, to obtain a molybdenum disulfide product. After 6 batches of production, product quality is detected, and the purity of the obtained product $MoS_2$ is up to 99.92%.

TABLE 5

Leaching parameters of the leaching processes in experimental operation 3

| Item | Concentration of the leaching solution | Amount of the leaching solution | Leaching temperature | Constant temperature time |
|---|---|---|---|---|
| Hydrochloric acid leaching | 30% | 190 Kg | 65° C. | 50 min |
| Hydrofluoric acid leaching | 80% | 120 Kg | 85° C. | 45 min |
| Chloride salt leaching | $CuCl_2$ 2% + $FeCl_3$ 8% | 80 Kg | 80° C. | 40 min |

Example 4

Chemical ingredients of a batch of 200 Kg molybdenite powder are listed in Table 1. Molybdenum disulfide is prepared from the molybdenite powder by leaching by using hydrochloric acid, hydrofluoric acid, and a chloride salt for impurity removal.

The leaching apparatus is the microwave ultrasonic reactor in Embodiment 4 of the present invention, which has a capacity being 2 $m^3$ and a diameter being 1.1 m. A PTFE coating having a thickness being 1 mm is coated on an inner wall of the reactor. A pipeline microwave generation device and a return pipe are disposed outside the reactor. Single-tube output power of the magnetron of the microwave unit is 1000 W, one set has 4 microwave units that are horizontally disposed, 6 sets of magnetrons are disposed in total, and the total microwave power is 24 KW. The output power of the ultrasonic pulse unit is 125 W, one set has 24 ultrasonic pulse units, and 12 sets of ultrasonic pulse units are disposed in total. Power of the stirring motor is 5.5 KW, and 3 sets of turbine-shaped stirring blades are disposed on the stirring shaft.

Leaching parameters of specific implementation of the leaching processes are listed in Table 6. At the end of each leaching, solid-liquid separation is performed on a vacuum filter before next leaching. Powder obtained after chloride salt leaching and filtering is washed with deionized water and dried in a drying oven, to obtain a molybdenum disulfide product. After 6 batches of production, product quality is detected, and the purity of the obtained product $MoS_2$ is up to 99.92%.

TABLE 6

Leaching parameters of the leaching processes in experimental operation 4

| Item | Concentration of the leaching solution | Amount of the leaching solution | Leaching temperature | Constant temperature time |
|---|---|---|---|---|
| Hydrochloric acid leaching | 35% | 190 Kg | 75° C. | 55 min |
| Hydrofluoric acid leaching | 85% | 120 Kg | 85° C. | 50 min |
| Chloride salt leaching | $CuCl_2$ 2% + $FeCl_3$ 8% | 80 Kg | 72° C. | 30 min |

As can be seen from the results of experimental operations 2 to 4, for preparation of molybdenum disulfide from molybdenite by using the microwave ultrasonic reactor of the present invention through three-step leaching, in the ranges of leaching process parameters, and within the constant temperature time of 30 to 60 min, the molybdenum disulfide product having a purity being 99.90% and more can be obtained, and desired effects of apparatus design are achieved.

What is claimed is:

1. A method of chemical leaching for impurity removal comprising:
   preparing molybdenum disulfide with molybdenite as raw materials; and
   removing impurities by chemical leaching in an industrial microwave ultrasonic reactor comprising:
   a reactor, a microwave generation device, an ultrasonic wave generation device, a stirring device, and a heat removal device, wherein a feed port and an exhaust port are disposed at the top of the reactor, a discharge port is disposed at the bottom of the reactor, and an inner wall of the reactor has a liner made of an anti-corrosion wave-transmitting material;
   the microwave generation device is formed by microwave units distributed at intervals on an outer sidewall of the reactor, or is formed by a microwave pipe disposed outside the reactor and microwave units distributed at intervals on the microwave pipe, and each microwave unit comprises a magnetron, a diode, a transformer, and a waveguide that are electrically connected; one end of the microwave pipe communicates with the bottom of the reactor via a connection pipe I, and the other end communicates with the top of the reactor via a return pipe;
   a shield is disposed outside the microwave generation device to separate the microwave units from the outside, the heat removal device is disposed outside the shield, the heat removal device comprises a heat removal fan and an exhaust duct connected to the heat removal fan, and the other end of the exhaust duct communicates with a heat removal port on the shield;
   the ultrasonic wave generation device is formed by ultrasonic pulse units disposed at intervals along the outer sidewall of the reactor, 10 to 30 sets of ultrasonic pulse units are disposed from top to bottom, each set has 10 to 50 members distributed along the circumferential direction of the reactor, and each ultrasonic pulse unit comprises an ultrasonic generator and a transducer that are electrically connected; and the stirring device comprises a stirring shaft fixed below a stirring motor and extending into the reactor, a mechanical seal is disposed at the junction of the stirring shaft and the reactor, and blades are fixed on the stirring shaft.

2. The method according to claim 1, wherein the liner is a release anti-corrosion coating adhered to the inner wall of the reactor, and the thickness of the coating is 0.05 to 3 mm.

3. The method according to claim 1, wherein the liner is a release anti-corrosion barrel and disposed in an inner cavity of the reactor, having a shape matching a shape of the inner wall of the reactor, and having a reduced diameter, the thickness of the release anti-corrosion barrel is 3 to 30 mm, glass wool is disposed between the release anti-corrosion barrel and the inner wall of the reactor, and the release anti-corrosion barrel, and the glass wool, and the reactor are adhered in sequence.

4. The method according to claim 1, wherein magnetron power of the microwave unit is 600 to 1500 W; and power of the ultrasonic pulse unit is 0 to 5000 W.

5. The method according to claim 1, wherein 2 to 6 sets of microwave units are disposed on the outer sidewall of the reactor in total, the sets of microwave units are distributed at positions of different heights on the outer wall of the reactor at an equal interval, and each set has 2 to 18 microwave units disposed surrounding the outer wall of the reactor along the horizontal direction; the microwave units and the ultrasonic pulse units are arranged in a staggered manner; an opening corresponding to the magnetron of the microwave units is disposed on the wall of the reactor, the magnetron and the reactor are connected by using a bolt at the opening and sealed by using a polyethylene pad; and each set of microwave units and each set of ultrasonic pulse units respectively have an independent power switch.

6. The method according to claim 1, wherein the microwave pipe is made of a metal outer wall lined with a wave-transmitting material, and the microwave pipe is designed to be a straight pipe, a serpentine pipe, or a spiral pipe; the magnetron of the microwave units is disposed on the outer wall of the microwave pipe; the return pipe comprises a connection pipe II, a transfer pump V, and a return pipe II that are connected in sequence, the connection pipe II communicates with the microwave pipe, and the return pipe II communicates with the top of the reactor.

7. The method according to claim 1, wherein a guard disc having a diameter less than a diameter of the reactor is disposed in the reactor, the guard disc is coaxially fixed on the stirring shaft, and is located above a liquid level of slurry in the reactor; a return pipe I having a transfer pump IV is disposed outside the reactor, a lower end of the return pipe I communicates with the bottom of the reactor, an upper end extends into the reactor through a return port at the top of the reactor and reaches the above of the guard disc.

8. The method according to claim 1, wherein a transfer pump III and a circulation pipe connected to the transfer pump III are disposed outside the reactor, a lower end of the circulation pipe communicates with the bottom of the reactor, and an upper end communicates with a circulation port at the top of the reactor.

9. The method according to claim 1, wherein the stirring device has 2 to 8 sets of blades disposed from top to bottom, and the blades are designed to have one of or any combination of a propeller shape, a turbine shape, a flat paddle shape, and an anchor shape.

10. The method according to claim 1, wherein the reactor has a maintenance flange, and a metal protection screening is disposed along a periphery at the outside of the maintenance flange.

* * * * *